United States Patent [19]

Suzuki

[11] Patent Number: 5,684,484
[45] Date of Patent: Nov. 4, 1997

[54] METHOD AND APPARATUS FOR MULTI-CHANNEL DIGITAL RECEPTION AND APPARATUS OF ULTRASONIC DIAGNOSIS

[75] Inventor: Yoichi Suzuki, Tachikawa, Japan

[73] Assignee: GE Yokogawa Medical Systems, Limited, Tokyo, Japan

[21] Appl. No.: 549,861

[22] PCT Filed: May 11, 1995

[86] PCT No.: PCT/JP95/00914

§ 371 Date: Oct. 16, 1995

§ 102(e) Date: Oct. 16, 1995

[87] PCT Pub. No.: WO95/31135

PCT Pub. Date: Nov. 23, 1995

[30] Foreign Application Priority Data

May 12, 1994 [JP] Japan ................... 6-098274

[51] Int. Cl.⁶ .................................................. A61B 8/00
[52] U.S. Cl. ........................... 341/155; 128/660.01
[58] Field of Search ............. 341/155; 128/660.01, 128/661.01

[56] References Cited

U.S. PATENT DOCUMENTS 5,027,821  7/1991  Hirama et al. ................ 128/661.01

Primary Examiner—Jeffrey A. Gaffin
Assistant Examiner—Peguy JeanPierre
Attorney, Agent, or Firm—Moonray Kojima

[57] ABSTRACT

Phase-matched summation of multiple channels is made possible without the need of sampling clocks of multiple phases. The restriction on the reference wave frequency is alleviated even for a constant sampling rate.

It comprises a probe 2 which receives a ultrasonic echo signal and delivers analog reception signals from its multiple channels, A/D converters 31-3x, delay circuits 41-4x of multiple channels which delay digital data for prescribed delay times, digital orthogonal detection circuits 61-6x which implement the digital orthogonal detection for the delayed digital data and extracts channel common-phase components and channel orthogonal components, a summing circuit 7I which sums the common-phase components of all channels to obtain a composite common-phase component I, and a summing circuit 7Q which sums the orthogonal components of all channels to obtain a composite orthogonal component Q.

Digital delay is conducted while data is still at a high frequency and digital orthogonal detection is conducted afterward, and therefore sampling clocks of multiple phases are not needed and control is simplified. Orthogonal detection signals are obtained by the interpolation calculation, and therefore the restriction on the allowable reference wave frequency is alleviated even for a constant sampling rate.

5 Claims, 7 Drawing Sheets

| n SAMPLING POINTS FREQUENCY | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| fs | ↑ | ↑ | ↑ | ↑ | ↑ | ↑ | ↑ | ↑ | ↑ | ↑ | ↑ | ↑ | ↑ | ↑ | ↑ | ↑ | ↑ |
| REFERENCE WAVE fs/4 | I | Q | -I | -Q | I | Q | -I | -Q | I | Q | -I | -Q | I | Q | -I | -Q | I |
| REFERENCE WAVE fs/16 | I | | | | Q | | | | -I | | | | -Q | | | | I |
| REFERENCE WAVE 3fs/32 | (Q) | (Q) | (-I) | (-Q) | | (-I) | | (I) | | (-I) | (I) | (-Q) | | (I) | (Q) | (Q) | |
| REFERENCE WAVE 5fs/32 | | | | | | | | | | | | | | | | | | remarks:

for fs/4: #0 is I; #1 is Q for fs/16: #0 is I; #4 is Q for 3fs/32: #0 is I; interpolated point among #1–#4 is Q, interpolated point among #4–#7 is -I; #8 is -Q for 5fs/32: #0 is I; interpolated point among #0–#3 is Q; interpolated point among #2–#5 is -I; interpolated point among #3–#6 is -Q; interpolated point among #5–#8 is I; #8 is Q

FIG.9
PRIOR ART

METHOD AND APPARATUS FOR MULTI-CHANNEL DIGITAL RECEPTION AND APPARATUS OF ULTRASONIC DIAGNOSIS

(TECHNICAL FIELD)

The present invention relates to a method and apparatus for multi-channel digital reception and an apparatus of ultrasonic diagnosis, and more particularly to a method and apparatus for multi-channel digital reception and an apparatus of ultrasonic diagnosis based on the digital processing for obtaining common-phase components and orthogonal components from analog reception signals originating from a signal source and arriving on multiple channels by way of different transfer routes.

(BACKGROUND ART)

Figure 8:
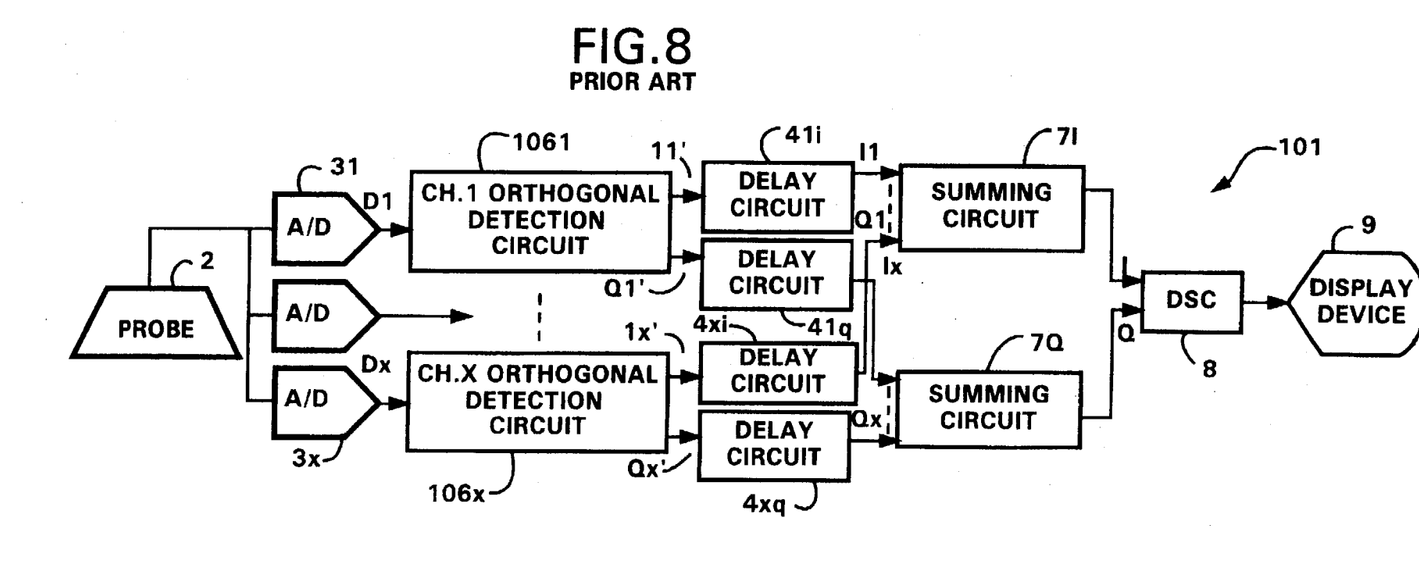
FIG. 8 is an explanatory diagram for an example of conventional apparatus of ultrasonic diagnosis.

FIG. 8 is a block diagram of an example of conventional apparatus of ultrasonic diagnosis.

In this ultrasonic diagnostic apparatus 101, a probe 2 which receives a ultrasonic echo signal delivers analog reception signals from its multiple channels, and the signals are converted into digital data D1-Dx by A/D converters 31-3x. Next, the digital data D1-Dx are rendered the orthogonal detection by orthogonal detection circuits 1061-106x of channel 1 through channel x so that channel common-phase components I1'-Ix' and channel orthogonal components Q1'-Qx' are extracted. Next, the extracted components are delayed by delay circuits 41i-4xq so that the difference of propagation times of the ultrasonic echo among the channels is nullified. Next, the delayed channel common-phase components I1-Ix are summed by a summing circuit 7I to obtain a composite common-phase component I, and the delayed channel orthogonal components Q1-Qx are summed by a summing circuit 7Q to obtain a composite orthogonal component Q. A DSC (Digital Scan Converter) produces a Doppler image or color flow mapping image from the composite common-phase component I and composite orthogonal component Q, and the image is displayed by a display device 9.

There is known "digital phase apparatus" described in Japanese patent publication JP-A-Hei-5-184568 as a pertinent prior art. However, this patent publication does not disclose at all the technique related to the orthogonal detection.

Figure 9:
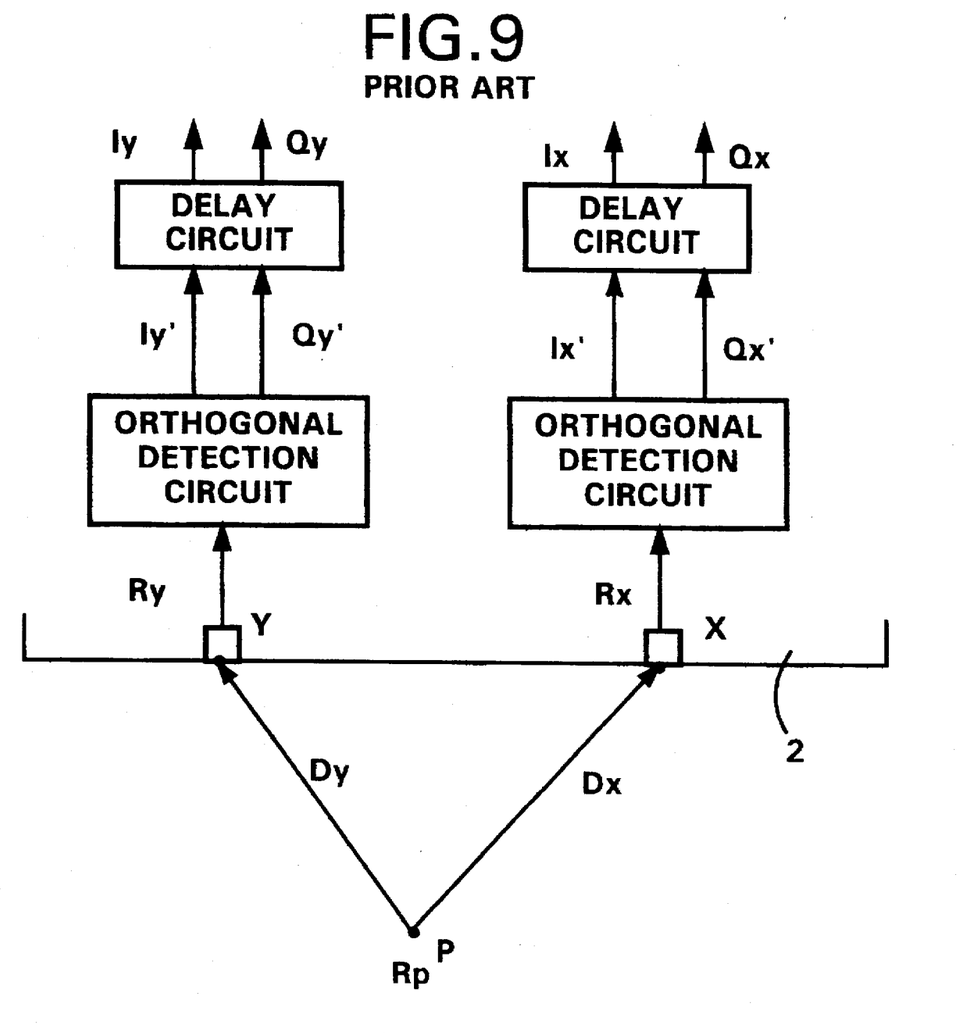
FIG. 9 is an explanatory diagram for the prior an problems.

FIG. 9 is an explanatory diagram showing that a ultrasonic continuous wave emitted by the probe 2 is reflected at point P and a resulting reflected ultrasonic echo is received by channel X and channel Y.

The ultrasonic echo at point P is assumed to be expressed as follows:

$$Rp(t)=A(t)\cdot\sin(2\pi f_0 t) \quad (1)$$

For the sound velocity c, the traveling distance Dx to the channel X and the traveling distance Dy to the channel Y, the reception signal of channel X is:

$$Rx(t)=A(t-Dx/c)\cdot\sin(2\pi f_0 t-DX/c) \quad (2)$$

The reception signal of channel Y is:

$$Ry(t)=A(t-Dy/c)\cdot\sin(2\pi f_0 t-Dy/c) \quad (3)$$

These signals are rendered the orthogonal detection by using the reference signals $\cos(2\pi f_0 t)$ and $\sin(2\pi f_0 t)$, and the orthogonal detection circuit produces outputs:

$$Ix'(t)=-(\tfrac{1}{2})\cdot A(t-Dx/c)\cdot\sin(2\pi f_0 Dx/c) \quad (4)$$

$$Qx'(t)=(\tfrac{1}{2})\cdot A(t-Dx/c)\cdot\cos(2\pi f_0 Dx/c) \quad (5)$$

$$Iy'(t)=-(\tfrac{1}{2})\cdot A(t-Dy/c)\cdot\sin(2\pi f_0 Dy/c) \quad (6)$$

$$Qy'(t)=(\tfrac{1}{2})\cdot A(t-Dy/c)\cdot\cos(2\pi f_0 Dy/c) \quad (7)$$

In the operation of digital orthogonal detection, digital data at prescribed sampling points are taken thereby to obtain the above-mentioned common-phase components Ix'(t) and Iy'(t) and orthogonal components Qx'(t) and Qy'(t), as will be explained later.

The delay circuits delay the signals so that the difference of the propagation time of the P-X route and the propagation time of the P-Y route is nullified as follows.

$$\begin{aligned} Ix(t) &= -(1/2)\cdot A(t-Dx/c-(Dy/c-Dx/c))\cdot\sin(2\pi f_0 Dx/c) \\ &= -(1/2)\cdot A(t-Dy/c)\cdot\sin(2\pi f_0 Dx/c) \end{aligned} \quad (8)$$

$$\begin{aligned} Qx(t) &= (1/2)\cdot A(t-Dx/c)\cdot(Dy/c-Dx/c))\cdot\cos(2\pi f_0 Dx/c) \\ &= (1/2)\cdot A(t-Dy/c)\cdot\cos(2\pi f_0 Dx/c) \end{aligned} \quad (9)$$

$$Iy(t)=Iy(t)=-(1/2)\cdot A(t-Dy/c)\cdot\sin(2\pi f_0 Dy/c) \quad (10)$$

$$Qy(t)=Qy(t)=(1/2)\cdot A(t-Dy/c)\cdot\cos(2\pi f_0 Dy/c) \quad (11)$$

The comparison of the above Ix(t) and Iy(t) reveals that they are consistent in the time factor in the term of amplitude, but they are out of phase. The comparison of the above Qx(t) and Qy(t) reveals that they are consistent in the time factor in the term of amplitude, but they are out phase.

Namely, the procedure of the orthogonal detection first by using the reference signals $\cos(2\pi f_0 t)$ and $\sin(2\pi f_0 t)$, and the delay operation next cannot achieve the phase-matched summation.

Otherwise, when the following reference signals are used for the orthogonal detection of channel X:

$$rix=\cos(2\pi f_0(t-(Dy/c-Dx/c))) \quad (12)$$

$$rqy=\sin(2\pi f_0(t-(Dy/c-Dx/c))) \quad (13)$$

It becomes:

$$Ix''(t)=-(\tfrac{1}{2})\cdot A(t-Dy/c)\cdot\sin(2\pi f_0 Dy/c) \quad (14)$$

$$Qx''(t)=(\tfrac{1}{2})\cdot A(t-Dy/c)\cdot\cos(2\pi f_0 Dy/c) \quad (15)$$

Namely, by making the digital data sampling clock to have different phases among the channels, or by making digital orthogonal detection to have different sampling points among the channels, phase-matched summation is made possible.

In this case, however, sampling clocks of multiple phases are needed and the digital orthogonal detector becomes complex.

Digital orthogonal detection necessitates sampling points of at least four times the carrier frequency, and therefore in the case of a constant sampling rate fs, the carrier frequency is confined to be fs/4m (m=1, 2, 3, ... ). Although the above-mentioned restriction is dissolved by making the sampling rate variable in correspondence to the carrier frequency, the digital orthogonal detector becomes complex.

(DISCLOSURE OF INVENTION)

Accordingly, a first object of this invention is to provide a method and apparatus for multi-channel digital reception and an apparatus of ultrasonic diagnosis capable of implementing the phase-matched summation of multiple channels without the need of sampling clocks of multiple phases.

A second object of this invention is to provide a method and apparatus for multi-channel digital reception and an apparatus of ultrasonic diagnosis capable of alleviating the above-mentioned restriction even for a constant sampling rate.

At a fast viewpoint, this invention provides a method of multi-channel digital reception in which analog reception signals originating from a signal source and arriving on multiple channels by way of different transfer routes are convened into digital data, each piece of digital data is delayed so that the difference of propagation times among the channels is nullified, each piece of digital data is rendered the digital orthogonal detection thereby to extract a channel common-phase component and a channel orthogonal component, the channel common-phase components are summed to obtain a composite common-phase component, and the channel orthogonal components are summed to obtain a composite orthogonal component.

At a second viewpoint, this invention provides an apparatus for multi-channel digital reception which comprises multi-channel reception means which receives signals originating from a signal source and arriving by way of different transfer routes and produces analog reception signals, multi-channel A/D conversion means for converting each of the analog reception signals into digital data, multi-channel delay means for delaying each piece of digital data by a prescribed delay time, digital orthogonal detection means which implements the digital orthogonal detection for each piece of delayed digital data thereby to extract a channel common-phase component and a channel orthogonal component, common-phase component summing means which sums the common-phase components to obtain a composite common-phase component, and orthogonal component summing means which sums the channel orthogonal components to obtain a composite orthogonal component.

At a third viewpoint, this invention provides an apparatus for multi-channel digital reception which comprises multi-channel reception means which receives signals originating from a signal source and arriving by way of different transfer routes and produces analog reception signals, multi-channel A/D conversion means for converting each of the analog reception signals into digital data, a memory for storing the digital data, write control means which writes the digital data into the memory by sampling the data at a prescribed sampling interval $\Delta T$, read control means which reads out of the memory two pieces or more of digital data having sampling times close to a time $t_m$ that is different from a certain object time $t_0$ by a time length $T_m$ that is a multiple of the sampling interval $\Delta T$, interpolation calculation means which calculates interpolated digital data at a time $t_k$ that is different from the time $t_m$ by a time length $\tau k$ that is Smaller than the sampling interval $\Delta T$ based on the calculation of interpolation using the two pieces or more of digital data read out of the memory, sign inversion means which inverts the sign of the interpolated digital data, selection means which selects the interpolated digital data or the sign-inverted digital data or "0" depending on the object time $t_0$, low-pass filter means which extracts and delivers only the base band as a channel common-phase component or channel orthogonal component, common-phase component summing means which sums the channel common-phase components to obtain a composite common-phase component, and orthogonal component summing means which sums the channel orthogonal components to obtain a composite orthogonal component.

At a fourth viewpoint, this invention provides an apparatus of ultrasonic diagnosis including the foregoing multi-channel digital reception apparatus as a digital beam former.

The multi-channel digital reception method of the above-mentioned fast viewpoint is designed to implement the orthogonal detection for the obtained digital data of each channel after delaying the data, instead of delaying the data after the orthogonal detection.

Consequently, data of all channels are consistent not only in the time factor in the term of amplitude, but also in the phase. On this account, it becomes possible to implement the phase-matched summation of multiple channels without the need of sampling clocks of multiple phases.

The multi-channel digital reception method of the above-mentioned second viewpoint is designed such that the delay means delays the obtained digital data of each channel, the digital orthogonal detection means implements the digital orthogonal detection for each piece of delayed digital data, and the common-phase component summing means and orthogonal component summing means sum the resulting common-phase components and orthogonal components, respectively, of all channels thereby to obtain a composite common-phase component and a composite orthogonal component.

Consequently, data of all channels are consistent not only in the time factor in the term of amplitude, but also in the phase. On this account, it becomes possible to implement the phase-matched summation of multiple channels without the need of sampling clocks of multiple phases.

The above-mentioned delay means is preferably made up of a memory for storing digital data, write control means which writes the digital data into the memory by sampling the data at a prescribed sampling interval $\Delta T$, read control means which reads out of the memory two pieces or more of digital data having sampling times close to a time $t_m$ that is different from a certain object time $t_0$ by a time length $T_m$ that is a multiple of the sampling interval $\Delta T$, and interpolation calculation means which calculates interpolated digital data at a time $t_k$ that is different from the time ma by a time length $\tau_k$ which is smaller than the sampling interval $\Delta T$ based on the calculation of interpolation using the two pieces or more of digital data read out of the memory.

In this case, a delay of a time length $\tau_k$ smaller than the sampling interval $\Delta T$ can be accomplished by use of the interpolation calculation means even though the sampling interval $\Delta T$ is constant.

The multi-channel digital reception method of the above-mentioned third viewpoint is designed such that the memory, write control means and read control means operate in unison to delay digital data by a time length that is a multiple of the sampling interval $\Delta T$, and the interpolation calculation means implements the interpolation calculation for delaying the data by a time length smaller than the sampling interval $\Delta T$, thereby achieving a total delay time of $T_m + \tau_k$.

Consequently, delay times for nullifying the difference of propagation times among the channels can be obtained as a whole even though the sampling interval $\Delta T$ is constant.

In addition, it is designed such that if there is digital data necessary for the digital orthogonal detection between pieces of digital data which have been sampled actually, the interpolation calculation means calculates that digital data.

Consequently, the restriction on the allowable reference frequency can be alleviated even for a constant sampling rate.

The apparatus of ultrasonic diagnosis of the above-mentioned fourth viewpoint includes the foregoing multi-channel digital reception apparatus as a digital beam former, and it becomes possible to implement the phase-matched summation of multiple channels without the need of sampling clocks of multiple phases.

(BEST MODE FOR CARRYING OUT THE INVENTION)

The present invention will be explained in more detail for its illustrated embodiments, although the invention is not confined to these embodiments.

Figure 1:
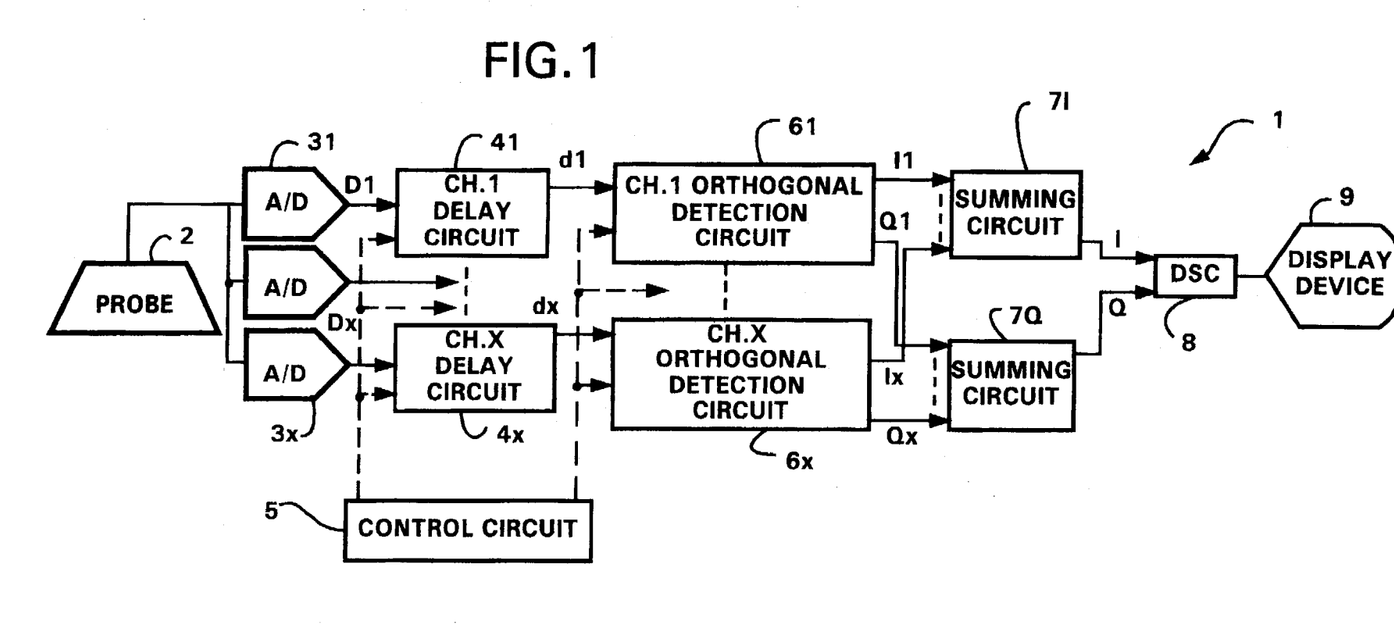
FIG. 1 is a block diagram of the apparatus of ultrasonic diagnosis based on an embodiment of this invention.

FIG. 1 is a block diagram of the ultrasonic diagnostic apparatus 1 based on an embodiment of this invention.

In the ultrasonic diagnostic apparatus 1, a probe 2 which receives a ultrasonic echo signal delivers analog reception signals from are converted into dig and the signals are converted into digital data D1–Dx by A/D converters 31–3x. Next, delay circuits 41–4x delay the digital data D1–Dx to produce digital data d1–dx. Next, the digital data d1–dx are rendered the orthogonal detection by orthogonal detection circuits 61–6x so that channel common-phase components I1–Ix and channel orthogonal components Q1–Qx are extracted. Next, the channel common-phase components I1–Ix are summed by a summing circuit 7I to obtain a composite common-phase component I, and the channel orthogonal components Q1–Qx are summed by a summing circuit 7Q to obtain a composite orthogonal component Q. A DSC produces a Doppler image or color flow mapping image from the composite common-phase component I and composite orthogonal component Q, and the image is displayed by a display device 9.

A control circuit 5 determines a delay time (explained later) and interpolation coefficient (explained later) in consideration of both the delay for phase-matching among the channels and interpolation calculation (explained later) of digital orthogonal detection, and issues control signals to set the results in the delay circuits 41–4x and orthogonal detection circuits 61–6x.

Figure 2:
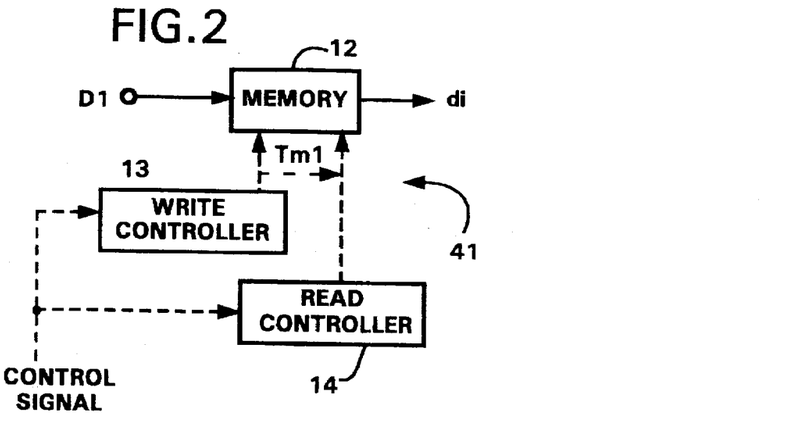
FIG. 2 is a detailed block diagram of the delay circuit of channel 1 shown in FIG. 1.

FIG. 2 is a block diagram of the delay circuit 41 of channel 1.

Figure 4:
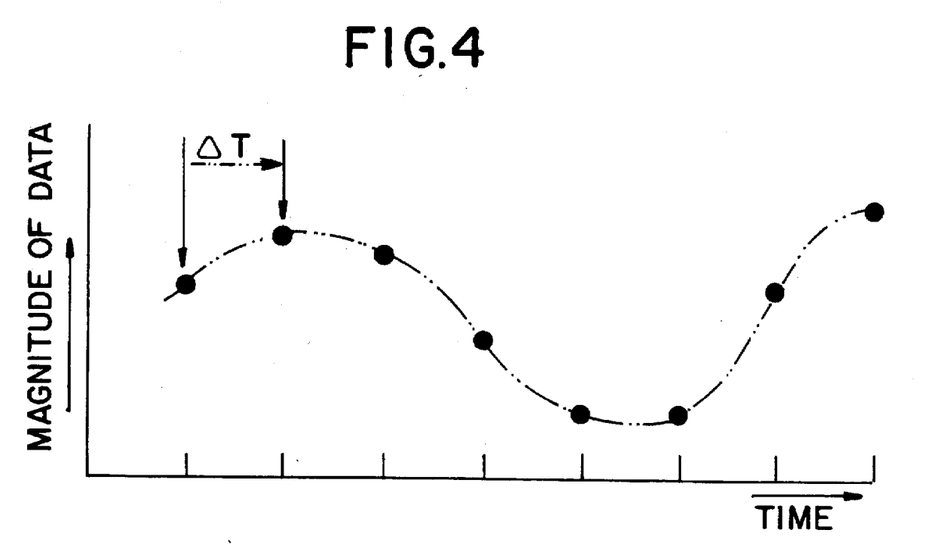
FIG. 4 is an explanatory diagram for the sampling of digital data.

The memory 12, which is given write addresses at the sampling interval $\Delta T$ from a write control means 13, stores digital data D1 of channel 1. FIG. 4 shows by mark ● the digital data D1 of channel 1. The 2-dot-and-dash line is the reception signal of channel 1. The sampling interval $\Delta T$ is 100 ns for example.

For a time length $T_{m1}$ which is a multiple of the sampling interval $\Delta T$, a time length $\tau_k$ which is shorter than the sampling interval $\Delta T$, and a total delay time $T_{m1}+\tau_{k1}$, a read control means 14 provides the memory 12 with such a read address as for reading digital data D1 of channel 1 at the sampling time that precedes the current sampling time by $T_{m1}-\Delta T$. Accordingly, the memory 12 reads out digital data d1 of channel 1 which is the digital data of channel 1 at the sampling time that precedes the current sampling time by $T_{m1}-\Delta T$.

Delay circuits of other channels have the same arrangement.

Figure 3:
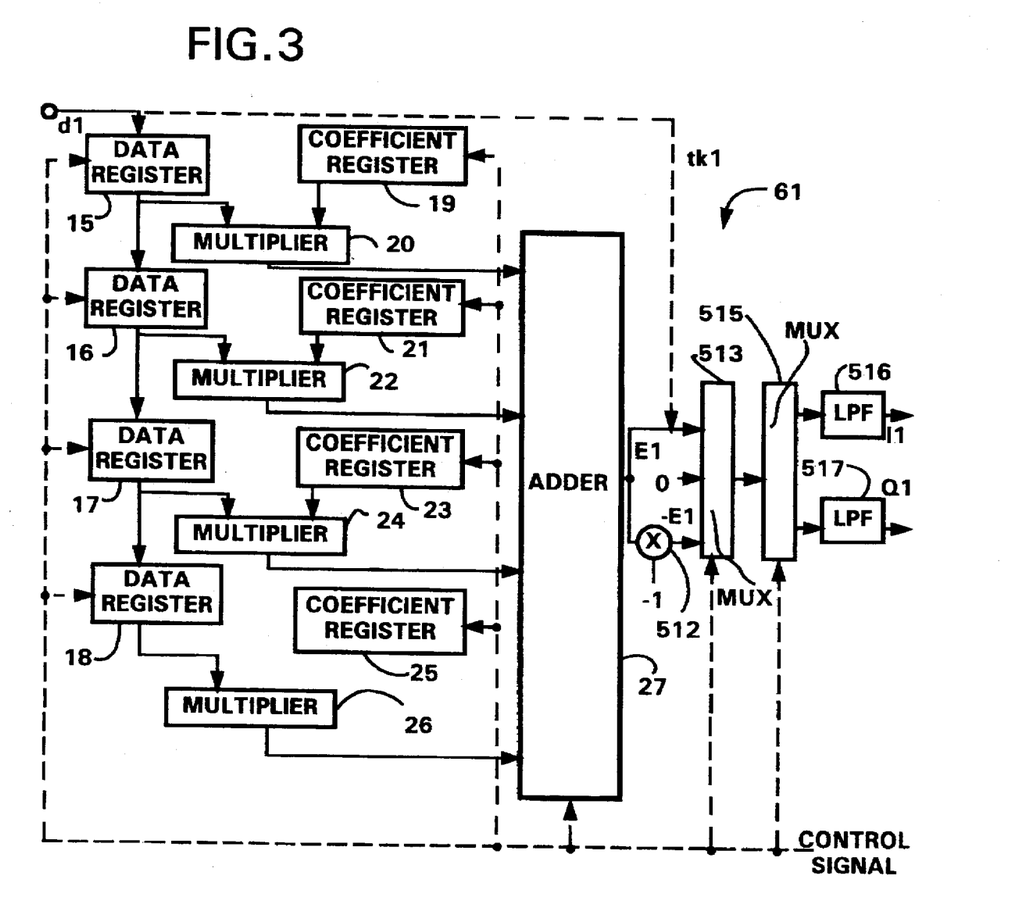
FIG. 3 is a detailed block diagram of the orthogonal detection circuit of channel 1 shown in FIG. 1.

FIG. 3 is a block diagram of the orthogonal detection circuit 61 of channel 1.

A data register 15 holds the digital data d1 of channel 1, which is the digital data at the sampling time preceding the current sampling time by $T_{m1}-\Delta T$. The data register 15 shifts the digital data which has been held by it to a data register 16 before it holds the new digital data.

Accordingly, the data register 16 holds digital data at the sampling time which precedes the current sampling time by $T_{m1}$. The data register 16 shifts the digital data which has been held by it to a data register 17 before it holds the new digital data.

Accordingly, the data register 17 holds digital data at the sampling time which precedes the current sampling time by $T_{m1}+\Delta T$. The data register 17 shifts the digital data which has been held by it to a data register 18.

Accordingly, the data register 18 holds digital data at the sampling time which precedes the current sampling time by $T_{m1}+2\Delta T$.

Coefficient registers 19, 21, 23 and 25 hold interpolation coefficients of mixed spline interpolation provided by control signals.

Multipliers 20, 22, 24 and 26 multiply the digital data held in the data registers 15, 16, 17 and 18 to the interpolation coefficients of mixed spline interpolation held in the coefficient registers 19, 21, 23 and 25, and deliver the results of multiplication to an adder 27.

The adder 27 sums the products, resulting in a piece of interpolated digital data at a virtual sampling time between the sampling times which precede the current sampling time by Tm1 and $T_{m1}-\Delta T$, respectively. By choosing properly interpolation coefficients of mixed spline interpolation to be held in the coefficient registers 19, 21, 23 and 25, the virtual sampling time can be set to be the time that precedes the current sampling time by $T_{m1}+\tau_k$.

Figure 5:
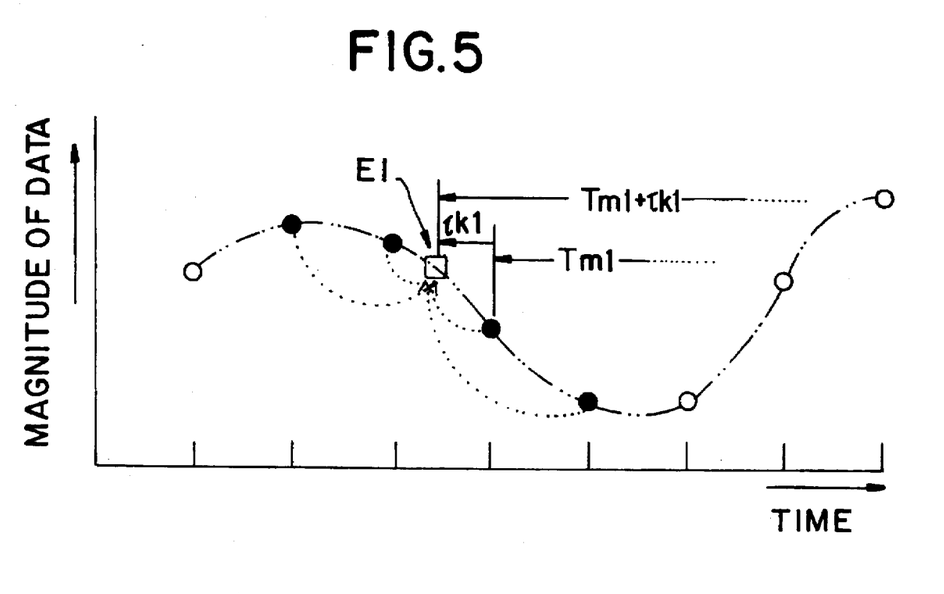
FIG. 5 is an explanatory diagram for the delay and interpolation.

FIG. 5 shows the concept of calculating the interpolated digital data E1 (□) from the four digital data (●) held in the data registers 15, 16, 17 and 18.

The interpolated digital data E1 is fed to a multiplier 512 and multiplexer 513.

The multiplier 512 multiplies −1 to the interpolated digital data E1, and delivers the sign-inverted interpolated digital data −E1 to the multiplexer 513.

The multiplexer 513 selects the interpolated digital data E1 or sign-inverted interpolated digital data −E1 or "0" in accordance with the control signal, and delivers the selected data to a multiplexer 515.

The multiplexer 515 delivers the interpolated digital data E1 or sign-inverted interpolated digital data −E1 or "0" selected by the multiplexer 513 to one of low-pass filters 516 and 517 in accordance with the control signal.

The low-pass filters 516 extracts the base band and delivers it as the common-phase component I1 of channel 1.

The low-pass filters 517 extracts the base band and delivers it as the orthogonal component Q1 of channel 1.

The principle of digital orthogonal detection will be explained.

For the beginning, analog orthogonal detection will be reviewed.

A reception signal R(t) is now assumed to be expressed by the following equation.

$$R(t) = A(t) \cdot \sin(2\pi f_0 t + \phi(t)) \tag{16}$$

This reception signal R(t) is rendered the orthogonal detection by using reference signals $\cos(2\pi f_0 t)$ and $\sin(2\pi f_0 t)$ thereby to obtain a common-phase component I(t) and orthogonal component Q(t) as follows.

$$\begin{aligned} I(t) &= A(t) \cdot \sin(2\pi f_0 t + \phi(t)) \cdot \cos(2\pi f_0 t) \\ &= (1/2) \cdot A(t) \cdot \sin(2 \cdot 2\pi f_0 t + \phi(t)) + \sin(\phi(t)) \end{aligned}$$

The signal is conducted through the low-pass filter to become:

$$I(t) = (\tfrac{1}{2}) \cdot A(t) \cdot \sin(\phi(t)) \tag{17}$$

Similarly:

$$Q(t) = (\tfrac{1}{2}) \cdot A(t) \cdot \cos(\phi(t)) \tag{18}$$

Next, when the reception signal R(t) is quantized at a sampling rate of $fs = 4f_0$, the quantized reception signal $Rq(n/fs)$ is expressed in terms of sampling numbers n (n=0, 1, 2, ...) as follows.

$$\begin{aligned} Rq(n/fs) &= A(n/fs) \cdot \sin(2\pi f_0 n/fs + \phi(n/fs)) \\ &= A(n/fs) \cdot \sin(2\pi f_0 n/4f_0 + \phi(n/fs)) \\ &= A(n/fs) \cdot \sin(2\pi(n/4) + \phi(n/fs)) \end{aligned}$$

For n/4 being 0, 1, 2, and so on, i.e., for n=0, 4, 8, and so on:

$$Rq(n/fs) = A(n/fs) \cdot \sin(\phi(n/fs)) \tag{19}$$

It represents the common-phase component I(t) of the equation (17).

For n/4 being ½, 3/2, 5/2 and so on, i.e., for n=2, 6, 10, and so on:

$$Rq(n/fs) = -A(n/fs) \cdot \sin(\phi(n/fs)) \tag{20}$$

By inverting the sign, it represents the common-phase component I(t) of the equation (17).

For n/4 being ¼, 5/4, 9/4 and so on, i.e., for n=1, 5, 9, and so on:

$$Rq(n/fs) = A(n/fs) \cdot \cos(\phi(n/fs)) \tag{21}$$

It represents the orthogonal component Q(t) of the equation (18).

For n/4 being ¾, 7/4, 11/4 and so on, i.e., for n=3, 7, 11, and so on:

$$Rq(n/fs) = -A(n/fs) \cdot \cos(\phi(n/fs)) \tag{22}$$

By inverting the sign, it represents the orthogonal component Q(t) of the equation (18).

Figure 6:
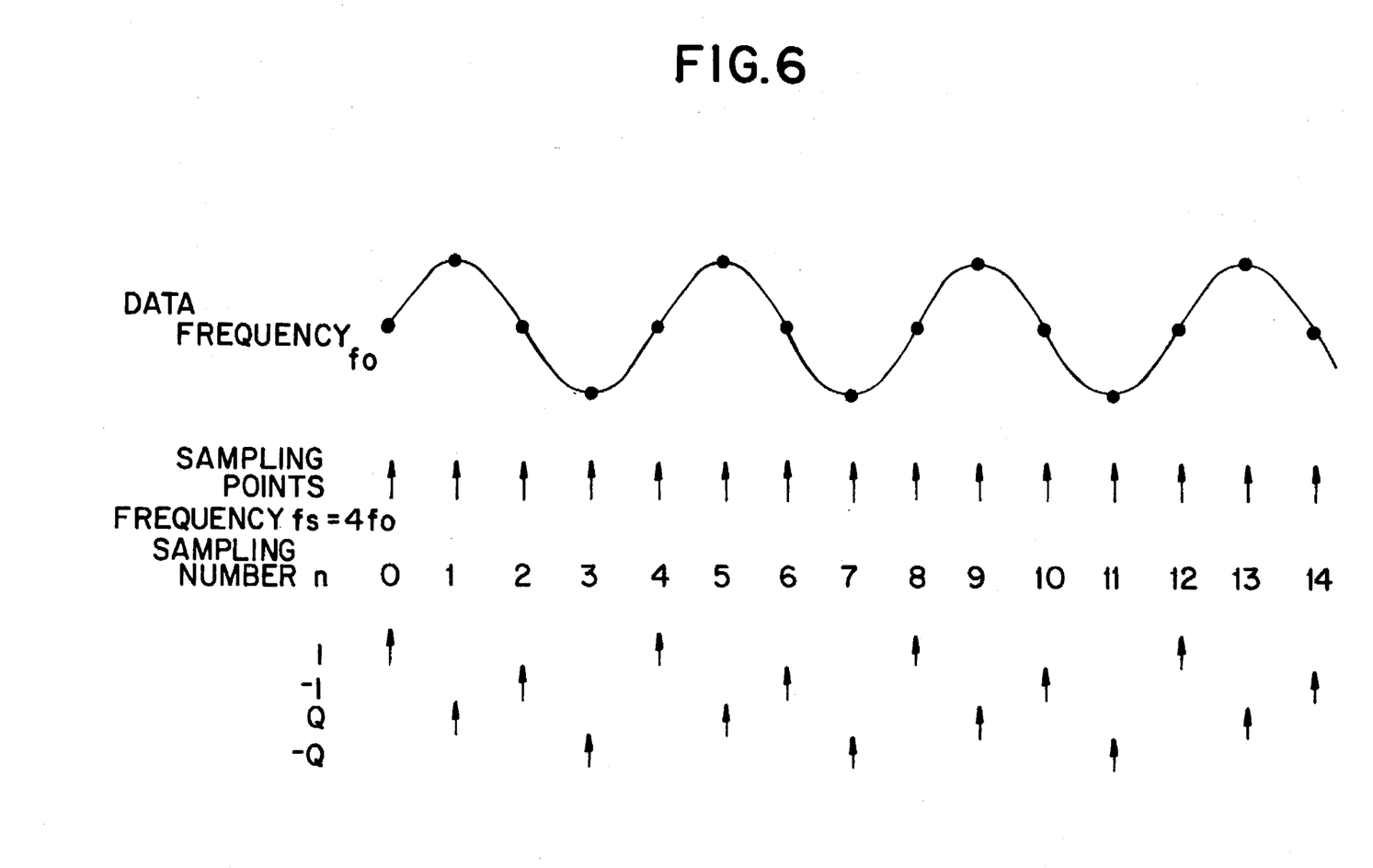
FIG. 6 is an explanatory diagram for the digital orthogonal detection.

If the sampling rate fs is sufficiently large relative to the bandwidth of the reception signal R(t):

Then, $n/fs = (n+1)/fs$ can be assumed. By sorting the digital data depending on the sampling number as shown in FIG. 6, common-phase components I and orthogonal components Q am obtained.

Figure 7:
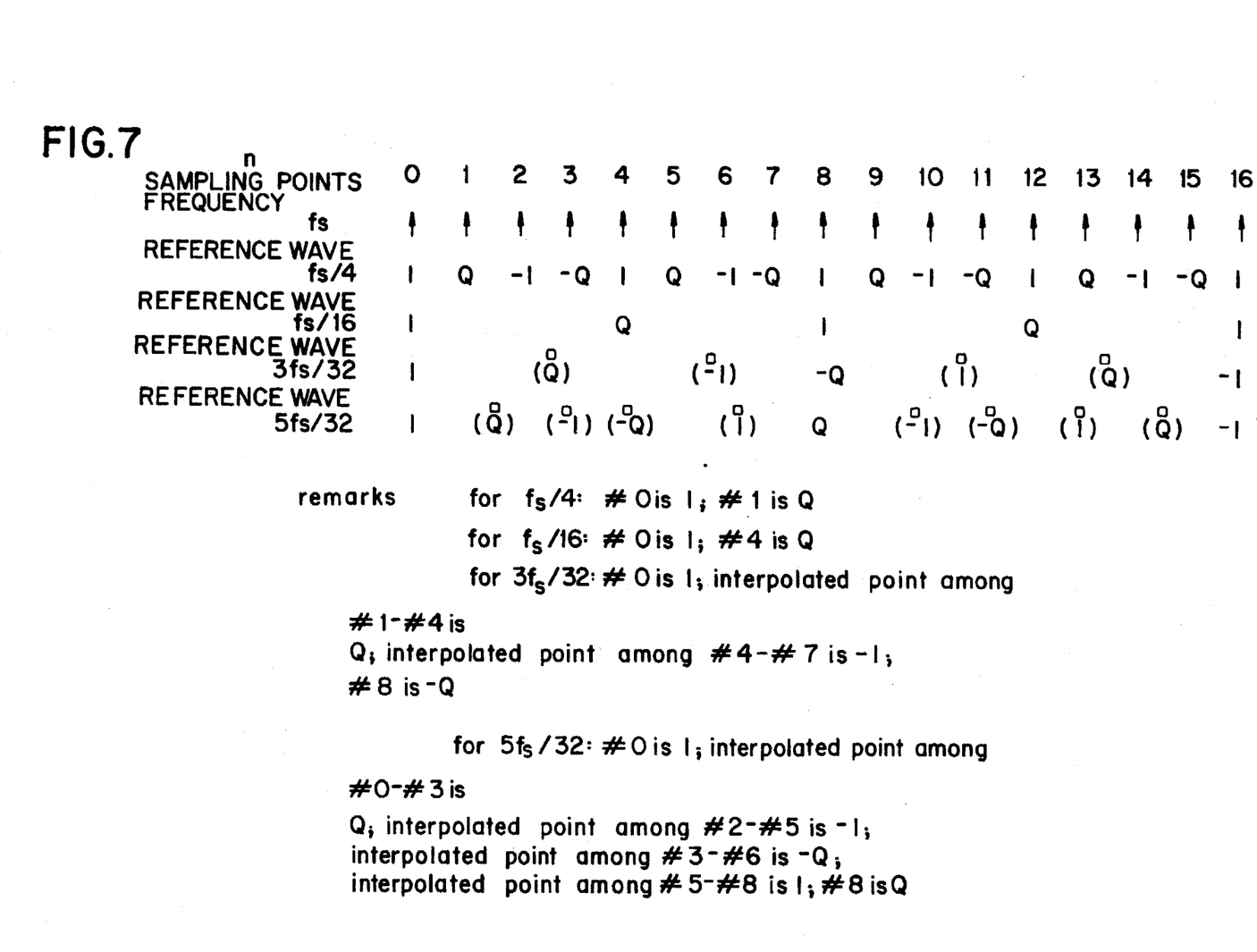
FIG. 7 is an explanatory diagram for the digital orthogonal detection for various reference wave frequencies.

FIG. 7 is a diagram for explaining the sampling points of the common-phase components I and orthogonal components Q for various reference waves.

The figure reveals that the implementation of interpolation enables to deal with various reference wave frequencies even though the sampling rate fs is constant.

According to the foregoing ultrasonic diagnostic apparatus 1, digital data of multiple channels are delayed and then rendered the orthogonal detection, and it becomes possible to implement the phase-matched summation of multiple channels without the need of sampling clocks of multiple phases.

Based on the delay of time lengths shorter than the sampling interval ΔT by the interpolation calculation, it becomes possible to obtain delay times for nullifying the difference of propagation times among the channels even though the sampling interval ΔT is constant. Consequently, sampling clocks of multiple phases are not needed, and control is simplified and the stability is enhanced.

Moreover, if there is digital data necessary for the digital orthogonal detection between pieces of digital data which have been sampled actually, the interpolation calculation means calculates that digital data, and consequently the restriction on the allowable reference wave frequency can be alleviated even for a constant sampling rate, and control is simplified and the stability is enhanced.

Using the mixed spline interpolation as in the foregoing embodiment enables the interpolation only with data of four points before and after the interpolation point, and it is suitable for a real-time system. B-spline interpolation or template spline interpolation may be used instead.

All sampled digital data may be used by rotating the interpolation coefficients.

According to the method and apparatus for multi-channel digital reception and an apparatus of ultrasonic diagnosis based on this invention, digital delay is conducted while data is still at a high frequency and thereafter digital orthogonal detection is conducted, and consequently sampling clocks of multiple phases are not needed and control is simplified and the stability is enhanced.

Orthogonal detection signals are obtained by the interpolation calculation, and consequently the restriction on the allowable reference wave frequency can be alleviated even for a constant sampling rate, and control is simplified and the stability is enhanced.

What is claimed is:

1. An apparatus for multi-channel digital reception comprising multi-channel reception means which receives signals originating from a signal source and arriving by way of different transfer routes and produces analog reception signals; multi-channel A/D conversion means for convening each of said analog reception signals into digital data; a memory for storing the digital data; write control means which writes the digital data into said memory by sampling the data at a prescribed sampling interval ΔT; read control means which reads out of said memory two pieces or more of digital data having sampling times close to a time $t_m$ that is different from a certain object time $t_0$ by a time length $T_m$ that is a multiple of the sampling interval ΔT; interpolation calculation means which calculates interpolated digital data at a time tk that is different from the time tm by a time length $\tau_k$ that is smaller than the sampling interval ΔT based on the calculation of interpolation using the two pieces or more of digital data read out of said memory; sign inversion means which inverts the sign of the interpolated digital data; selection means which selects the interpolated digital data or the sign-inverted digital data or "0" depending on the object time $t_0$; low-pass filter means which extracts and delivers only the base band as a channel common-phase component or channel orthogonal component; common-phase component summing means which sums the channel common-phase components to obtain a composite common-phase component; and orthogonal component summing means which sums the channel orthogonal components to obtain a composite orthogonal component.

2. An apparatus of ultrasonic diagnosis including the multi-channel digital reception apparatus set forth in claim 1 as a digital beam former.

3. A method of multi-channel digital reception comprising the steps of:

first converting analog reception signals originating from a signal source and arriving on a plurality of channels by way of different transfer routes into digital data;

then, delaying each piece of digital data so that difference of propagation times among the plurality of channels is nullified;

then, extracting from each piece of digital data a channel common-phase component and a channel orthogonal component; and then, concurrently summing the channel common-phase components to obtain a composite common-phase signal, and the channel orthogonal components to obtain a composite orthogonal component.

4. An apparatus for multi-channel digital reception comprising:

reception means for receiving signals originating from a signal source means and arriving by way of different transfer routes and for producing analog reception signals;

A/D conversion means for converting each of said analog reception signals into digital data;

delay means connected directly to said A/D conversion means for delaying each piece of digital data by a prescribed delay time;

detection means connected directly to said delay means for detecting digital orthogonal detection component for each piece of delayed digital data and for extracting a channel common-phase component and a channel orthogonal component therefrom; and summing means connected directly to said detection means for summing said common-phase components to obtain a composite common-phase signal, and for summing the channel orthogonal components to obtain a composite orthogonal signal.

5. The apparatus of claim 4, wherein said reception means comprises a digital beam former.

* * * * *